(12) United States Patent
Suzuki (10) Patent No.: US 8,858,002 B2
(45) Date of Patent: Oct. 14, 2014

(54) DOOR MIRROR

(75) Inventor: Kentaro Suzuki, Fujieda (JP)

(73) Assignee: Murakami Corporation, Shizuoka-Shi (JP)

( * ) Notice: Subject to any disclaimer, the term of this patent is extended or adjusted under 35 U.S.C. 154(b) by 90 days.

(21) Appl. No.: 13/560,222

(22) Filed: Jul. 27, 2012

(65) Prior Publication Data

US 2013/0070358 A1 Mar. 21, 2013

(30) Foreign Application Priority Data

Sep. 20, 2011 (JP) ................. 2011-205284

(51) Int. Cl.
- *G02B 7/182* (2006.01)
- *B60R 1/06* (2006.01)
- *B60R 1/072* (2006.01)

(52) U.S. Cl.
CPC ..................................... *B60R 1/072* (2013.01)
USPC .......................................... 359/877; 359/872

(58) Field of Classification Search
USPC ........................... 359/841, 872, 874, 876, 877
See application file for complete search history.

(56) References Cited

U.S. PATENT DOCUMENTS

| | | | |
|---|---|---|---|
| 4,693,571 A * | 9/1987 | Kimura et al. ................ | 359/874 |
| 4,701,037 A * | 10/1987 | Bramer ........................ | 359/874 |
| 4,815,837 A * | 3/1989 | Kikuchi et al. ............... | 359/874 |
| 4,915,493 A * | 4/1990 | Fisher et al. .................. | 359/874 |
| 4,930,370 A * | 6/1990 | Yoshida ....................... | 74/502.1 |
| 5,583,703 A * | 12/1996 | Lang et al. .................... | 359/877 |
| 5,724,200 A * | 3/1998 | Mochizuki .................... | 359/877 |
| 5,798,882 A * | 8/1998 | Lang ............................. | 359/872 |
| 5,896,238 A * | 4/1999 | Hubscher et al. ............. | 359/877 |
| 6,132,052 A * | 10/2000 | Huizenga et al. ............. | 359/877 |
| 6,213,612 B1 * | 4/2001 | Schnell et al. ................ | 359/877 |
| 6,357,885 B2 * | 3/2002 | Sakamoto et al. ............ | 359/877 |
| 6,830,352 B2 * | 12/2004 | Lang et al. .................... | 359/872 |

FOREIGN PATENT DOCUMENTS

JP 2005-238954 9/2005

\* cited by examiner

*Primary Examiner* — Ricky D Shafer
(74) *Attorney, Agent, or Firm* — Greenblum & Bernstein, P.L.C.

(57) ABSTRACT

A door mirror includes a mirror housing incorporated with a mirror holder fixed with a mirror, and a mirror surface angle adjusting unit for adjusting an angle of the mirror holder. The mirror housing is provided with a partition wall for partitioning an inner space of the mirror housing to a first space on a front side and a second space on a rear side, and the mirror holder and the mirror surface angle adjusting unit are accommodated in the second space. The partition wall is formed with an insertion hole for inserting a fastening component from a side of the first space, and the mirror surface angle adjusting unit is provided with a fixing hole for fastening the fastening component inserted into the insertion hole.

2 Claims, 9 Drawing Sheets

DOOR MIRROR

CROSS-REFERENCE TO RELATED APPLICATIONS

This application claims priority to Japanese Patent Applications No. 2011-205284 filed on Sep. 20, 2011, the entire contents of which are incorporated by reference herein.

BACKGROUND OF THE INVENTION

1. Field of the Invention

The present invention relates to a door mirror including a mirror surface angle adjusting unit for adjusting an angle of a mirror holder which is fixed with a mirror.

2. Related Background of the Invention

In a prior art, there is Japanese Patent Laid-Open No.2005-238954 as a technology in such a field. A door mirror described in the publication includes a mirror surface angle adjusting unit for adjusting an angle of a mirror holder which is made of a resin and fixed with a mirror, the mirror surface angle adjusting unit is accommodated in a mirror body (mirror housing), and the mirror is exposed from a mirror exposure opening of the mirror body. The mirror surface angle adjusting unit can adjust the mirror to an arbitrary angle by driving of two motors at inside thereof, and is fixed to the mirror body by screws from a side of the mirror exposure opening of the mirror body. Thereafter, the mirror surface angle adjusting unit and the mirror holder are integrated by insertion of claw portions provided at a back face of the mirror holder to groove portions of a pivot plate of the mirror surface angle adjusting unit.

[Patent Document 1] Japanese Patent Laid-Open No.2005-238954

SUMMARY OF THE INVENTION

Problems that the Invention is to Solve

The mirror surface angle adjusting unit of the door mirror of the prior art mentioned above is fixed to the mirror body by the screws from the side of the mirror exposure opening of the mirror body, and thereafter, the mirror holder is fixed to the mirror surface angle adjusting unit. However, when the mirror holder is fixed to the mirror surface angle adjusting unit by visual observation, it is extremely difficult to fit the claw portions that are disposed on the back face side of the mirror holder to the groove portions of the pivot plate of the mirror surface angle adjusting unit, and an assembly operation performance is obliged to depend on intuition, which extremely deteriorates the assembly operation performance. The reason is as follows. The mirror surface angle adjusting unit which is fixed to the mirror body by the screws is in a state of being brought deeply into the mirror body. Furthermore, the mirror holder has a shape of a large plate which substantially covers the mirror exposure opening of the mirror body. Therefore, when the assembling operation is carried out by visual observation, unless the mirror surface angle adjusting unit is tilted to a position which is near to a limit, a state of fitting the claw portions which are disposed on the back face side of the mirror holder to the groove portions of the pivot plate of the mirror surface angle adjusting unit cannot be visually recognized, and an operator is forced to carry out an operation of peeping into the state from a small gap. In this way, the troublesome operation of assembling the mirror surface angle adjusting unit and the mirror holder causes to deteriorate the assembly operation performance of the door mirror.

It is an object of the present invention to provide a door mirror having excellent assembly operation performance.

Means for Solving the Problems

The present invention is characterized in that in a door mirror configured by incorporating a mirror holder fixed with a mirror, and a mirror surface angle adjusting unit for adjusting an angle of the mirror holder into a mirror housing and exposing the mirror from a mirror exposure opening of the mirror housing, the mirror housing is provided with a partition wall for partitioning an inner space of the mirror housing to a first space on a front side and a second space on a rear side and fixing the mirror surface angle adjusting unit accommodated in the second space, the mirror housing includes a cover member for forming the first space in cooperation with the partition wall, and the partition wall is formed with an insertion hole for inserting a fastening component from a side of the first space, and the mirror surface angle adjusting unit is provided with a fixing hole for fastening the fastening component inserted into the insertion hole.

In the door mirror, the mirror holder and the mirror surface angle adjusting unit are accommodated in the second space from a side of the mirror exposure opening of the mirror housing, a harness is accommodated in the first space, and the partition wall is provided between the second space and the first space. When the mirror surface angle adjusting unit is fixed to the mirror housing, the fixing operation can be carried out from the side of the first space by adopting such a configuration. That is, the mirror surface angle adjusting unit can be fixed to the mirror housing by inserting the fastening component from the side of the first space into an insertion hole of the partition wall, and fastening the fastening component which penetrates through the partition wall to the mirror surface angle adjusting unit. In this way, the fastening operation of the fastening component is carried out from the side of the first space, and therefore, there is no troublesome operation as in the prior art, and an excellent assembly operation performance can be realized. Furthermore, the mirror housing includes the cover member for covering the first space in cooperation with the partition wall. Therefore, the fastening component can be concealed in the first space by mounting the cover member, and thus an external appearance quality of the door mirror can be improved without exposing the fastening component.

Furthermore, the mirror surface angle adjusting unit includes a motor holder fixed to the partition wall, a pivot plate fixed to the mirror holder and tilted by an adjustor rod that moves forward and backward in a center axis direction by driving of a motor, and an inner member arranged between the motor holder and the pivot plate to hold the motor in the motor holder and provided with a shaft portion forming a tilt center of the pivot plate, and the inner member is formed with the fixing hole, and the motor holder is formed with a through hole through which a screw as the fastening component penetrates.

When such a configuration is adopted, in fixing the mirror surface angle adjusting unit to the partition wall of the mirror housing, the screw as the fastening component is inserted into the insertion hole of the partition wall and the through hole of the motor holder from the side of the first space, and is finally screwed to the fixing hole of the inner member. Therefore, when the screw is continued to be tightened, the inner member is continued to be pressure-fixed to the motor holder by a strong force. As a result thereof, the mirror surface angle adjusting unit is fixed to the partition wall only by an operation of tightening the screw, at the same time, the motor can be clamped firmly and solidly by the inner member and the motor holder, and thus rattling of the motor can firmly be prevented in the mirror surface angle adjusting unit. Therefore, the inner member and the motor holder can solidly and fixedly be attached, and the water tightness of the motor clamped by the inner member and the motor holder can be improved.

Also, the partition wall is formed with an opening portion for exposing a terminal portion which is provided at a back face of the mirror surface angle adjusting unit. The insertion hole for inserting the fastening component is formed at a surrounding of the opening portion.

When such a configuration is adopted, the connection of the harness used for supplying an external power and the terminal portion of the mirror surface angle adjusting unit can be carried out from the side of the first space, which also helps to realize excellent assembly operation performance. Furthermore, downsizing of the back face of the mirror surface angle adjusting unit can be achieved by arranging the insertion hole at the surrounding of the opening portion for exposing the terminal portion, which contributes to downsizing the mirror surface angle adjusting unit.

Advantage of the Invention

According to the present invention, the assembly operation performance of the door mirror is improved.

DESCRIPTION OF THE PREFERRED EMBODIMENTS

A detailed explanation will be given of a preferred embodiment of a door mirror according to the present invention with reference to the drawings as follows. Incidentally, "front and rear" in an electric door mirror 1 is expressed in accordance with a front and rear direction of a vehicle.

Figure 1:
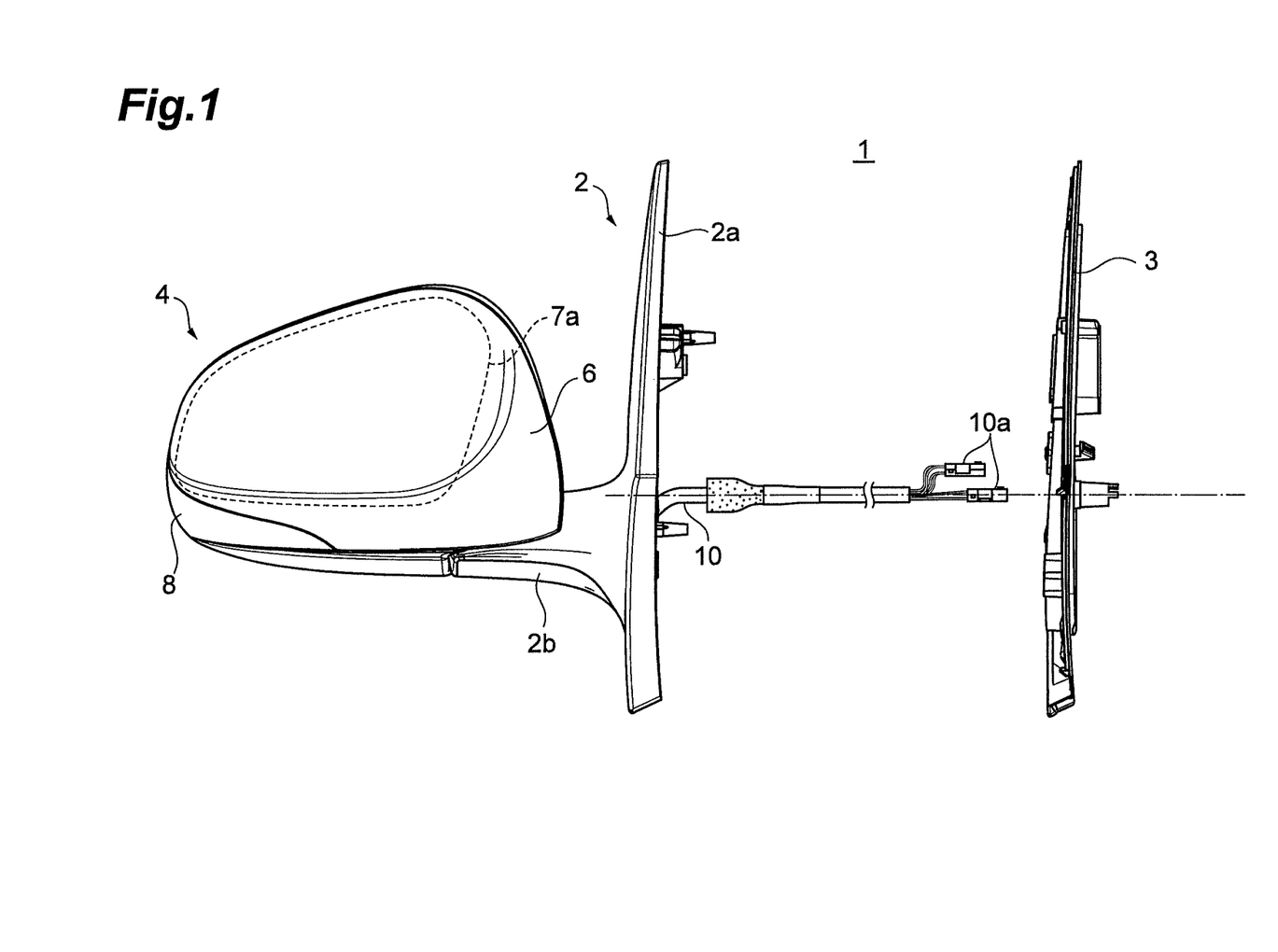
FIG. 1 is a front view showing an embodiment of a door mirror according to the present invention.

As shown in FIG. 1, the electric door mirror 1 is mainly configured by a door mirror base 2 which is fixed to a front door of a vehicle by bolts, a gasket 3 which is attached to a base main body 2a of the door mirror base 2 to achieve a seal function by being brought into close contact with the front door, and a door mirror main body 4 which is pivotably attached to a pedestal portion 2b of the door mirror base 2.

Figure 2:
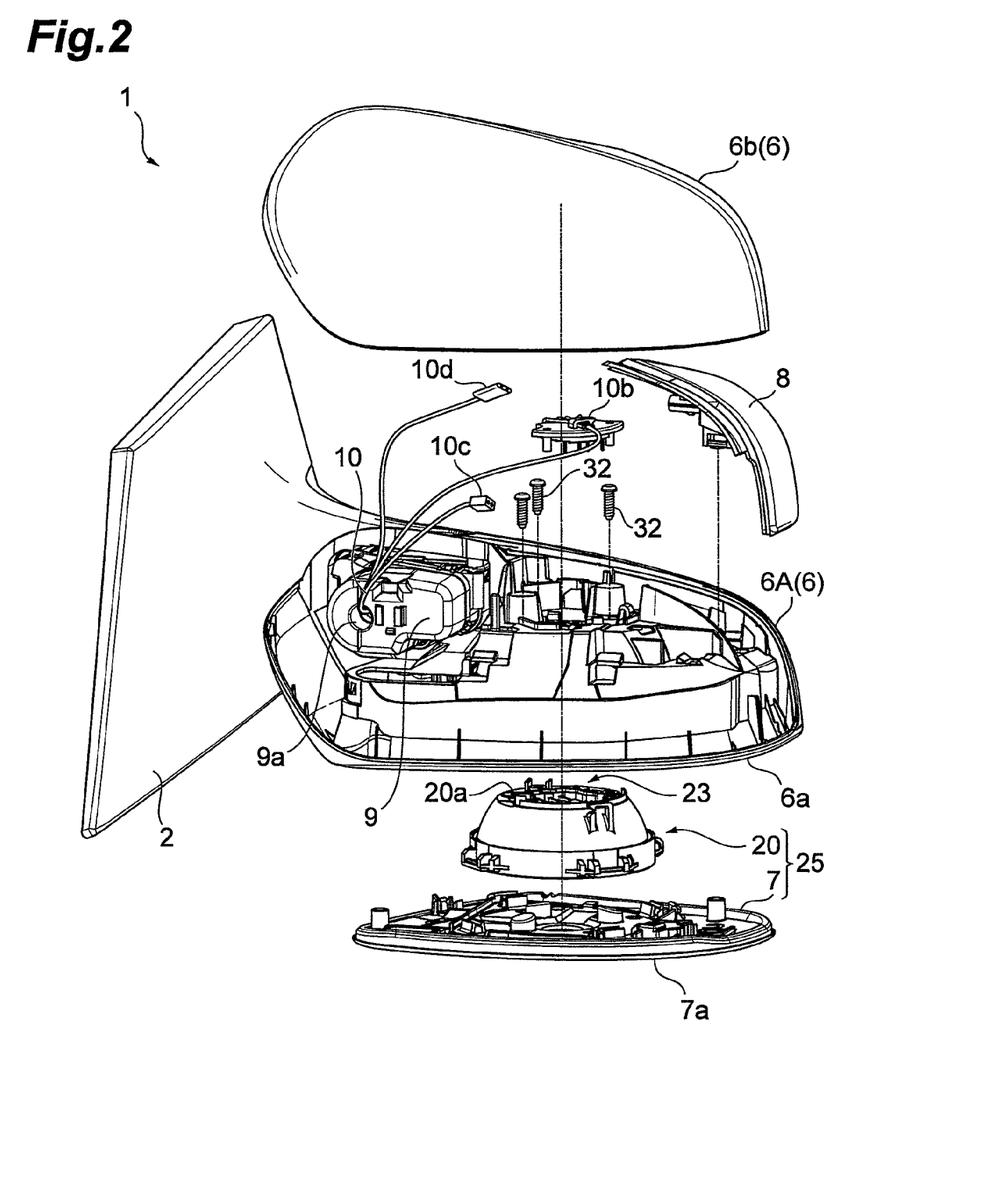
FIG. 2 is an exploded perspective view of the door mirror.

The door mirror main body 4 includes a mirror holder 7 which is arranged on a side of a mirror exposure opening 6a of a mirror housing 6, a mirror surface angle adjusting unit 20 which is fitted to a back face 7f of the mirror holder 7 that is fixed with a mirror 7a on a surface side for adjusting an angle of the mirror holder 7, an electric storage unit 9 which is connected to the pedestal portion 2b of the door mirror base 2 for bringing the door mirror main body 4 into a storage state by pivoting the door mirror main body 4 itself, and a turn lamp unit 8 which is fixed to the mirror housing 6.

Further, the electric door mirror 1 is provided with a harness 10 which is wired around in the door mirror base 2 and the door mirror main body 4 for supplying power respectively to a motor in the mirror surface angle adjusting unit 20, a motor in the electric storage unit 9, and a lamp in the turn lamp unit 8. The harness 10 is exposed to outside from the gasket 3 which is attached to the base main body 2a of the door mirror base 2. At one end of the harness 10, there is provided a connector portion 10a for connecting to wirings in the vehicle, and at the other end of the harness 10, there are provided a connector portion 10b which is connected to the mirror surface angle adjusting unit 20, a connector portion 10c which is connected to the electric storage unit 9, and a connector portion 10d which is connected to the turn lamp unit 8.

Further, the electric door mirror 1 is provided with a cover member 6b which forms a portion of the mirror housing 6. The cover member 6b is ordinarily painted with a color the same as that of the body of the vehicle, and is disposed on a front side of the mirror housing 6. The mirror housing 6 is configured by a housing main body 6A for accommodating the mirror surface angle adjusting unit 20 and the electric storage unit 9, and the cover member 6b. Further, the electric storage unit 9 is fixed to the housing main body 6A and includes a harness drawing hole 9a for passing the harness 10.

Figure 3:
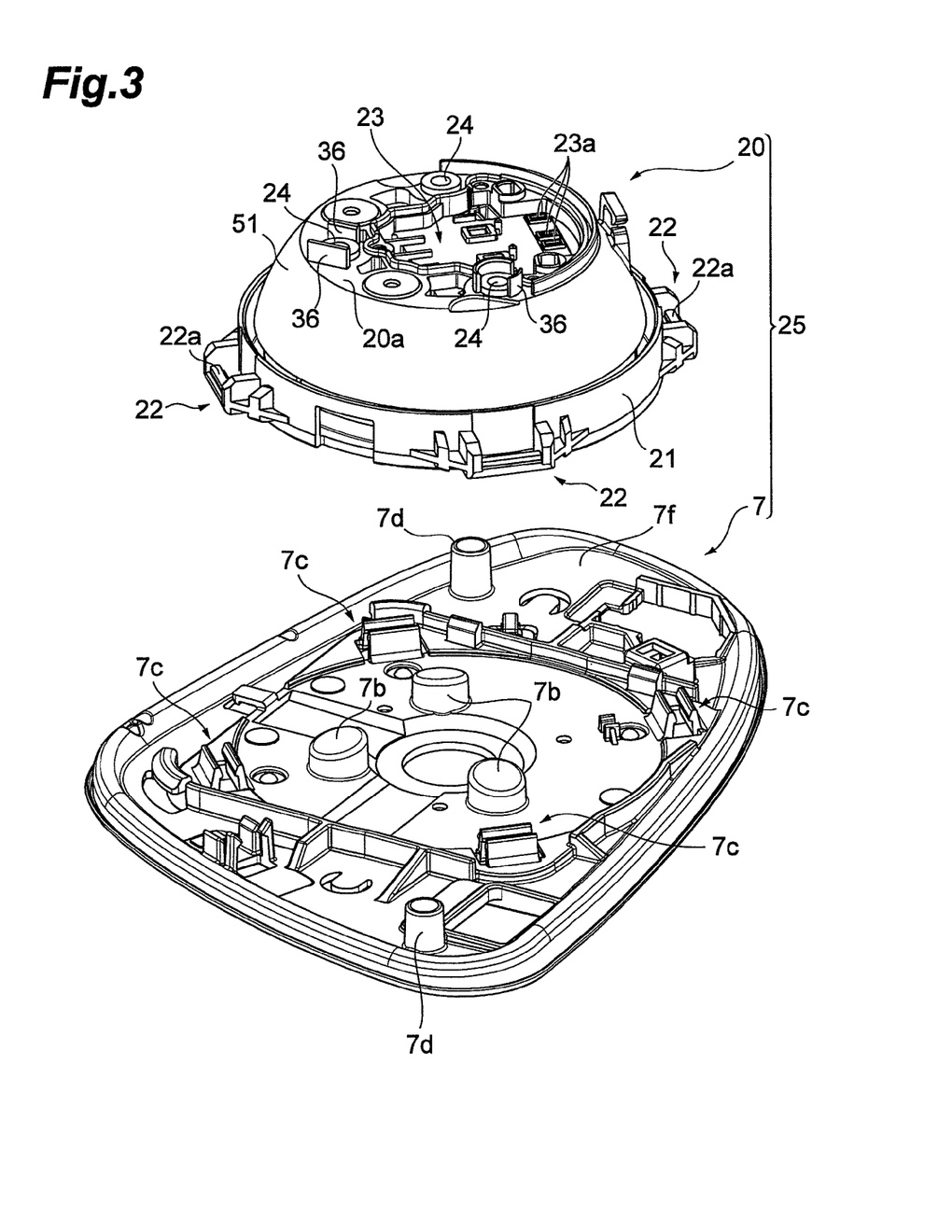
FIG. 3 is an exploded perspective view of a mirror unit assembling.

As shown in FIG. 3, the back face 7f of the mirror holder 7 is formed with four clamp claw portions 7c which are protruded for enabling to fix the mirror surface angle adjusting unit 20, and three protruded portions 7b enabling to position the mirror surface angle adjusting unit 20 relative to the mirror holder 7. Further, at the back face 7f of the mirror holder 7, four clamp claw portions 7c are arranged at equal intervals in a peripheral direction on an outer side of the three protruded portions 7b.

A tiltable pivot plate 21 which is provided at the mirror surface angle adjusting unit 20 has a circular outer periphery, and the pivot plate 21 is formed with catch portions 22 which protrude in a diameter direction. The catch portion 22 is provided with a catch bar 22a which is clamped by the clamp claw portion 7c of the mirror holder 7. Further, the pivot plate 21 of the mirror surface angle adjusting unit 20 is formed with positioning holes 21a (refer to FIG. 7) for inserting the protruded portions 7b of the mirror holder 7 respectively.

A back face 20a of the mirror surface angle adjusting unit 20 is provided with a terminal portion 23 in a recessed shape for connecting the connector portion 10b of the harness 10, and in the terminal portion 23 there are arranged feeding terminals 23a of a female side. Furthermore, female screw holes (fixing hole) 24 are arranged at a surrounding of the terminal portion 23 forming the recessed shape. Incidentally, the mirror holder 7 and the mirror surface angle adjusting unit 20 are integrated by cooperation between the clamp claw portions 7c and the catch bars 22a to form a mirror unit assembly 25.

The feeding terminals 23a include four terminals, two of which are connected to a first motor M1 (refer to FIG. 9) in the mirror surface angle adjusting unit 20, and the other two of which are connected to a second motor M2 (refer to FIG. 9) in the mirror surface angle adjusting unit 20. Incidentally, the first motor M1 tilts the mirror surface in a vertical direction, and the second motor M2 tilts the mirror surface in a horizontal direction.

Figure 4:
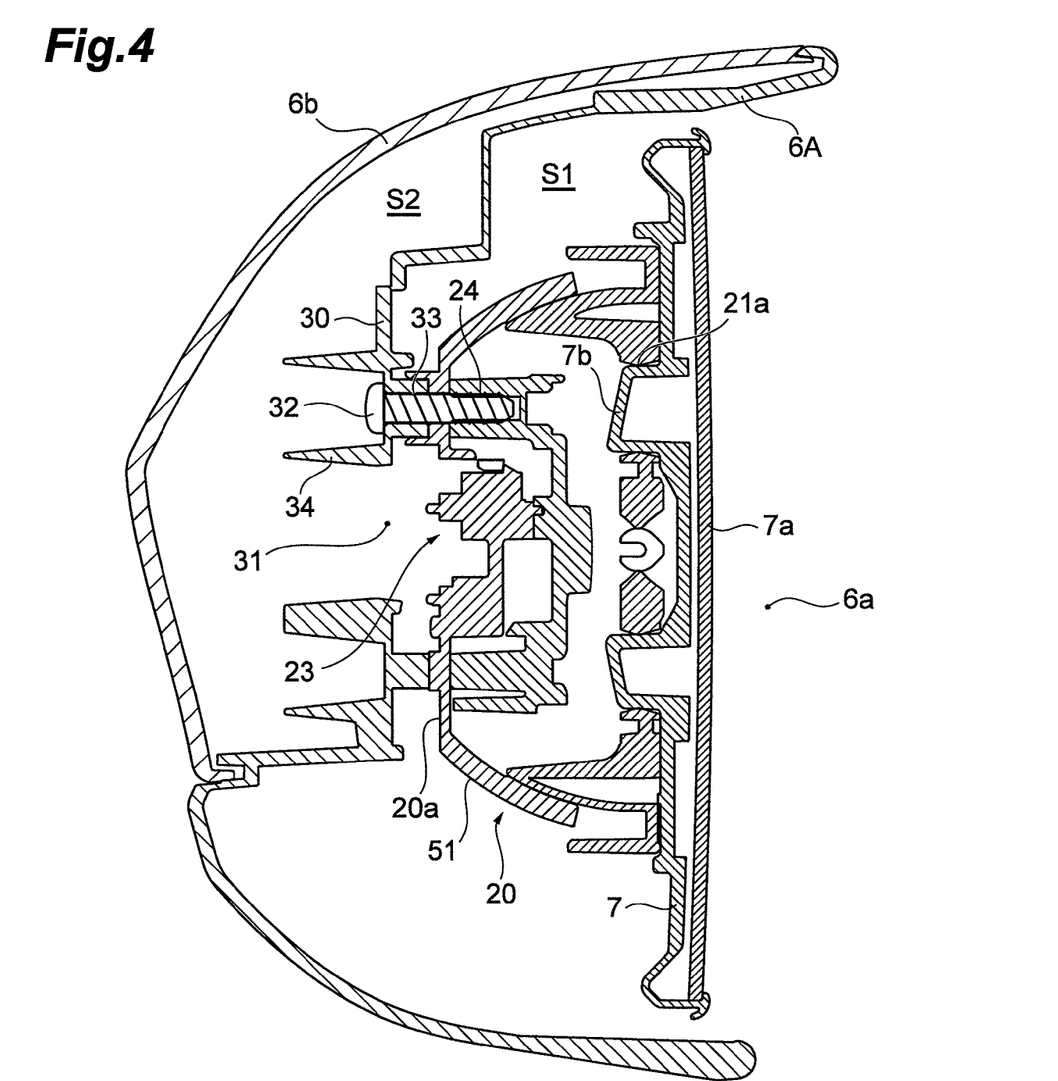
FIG. 4 is a sectional view of the door mirror.
Figure 5:
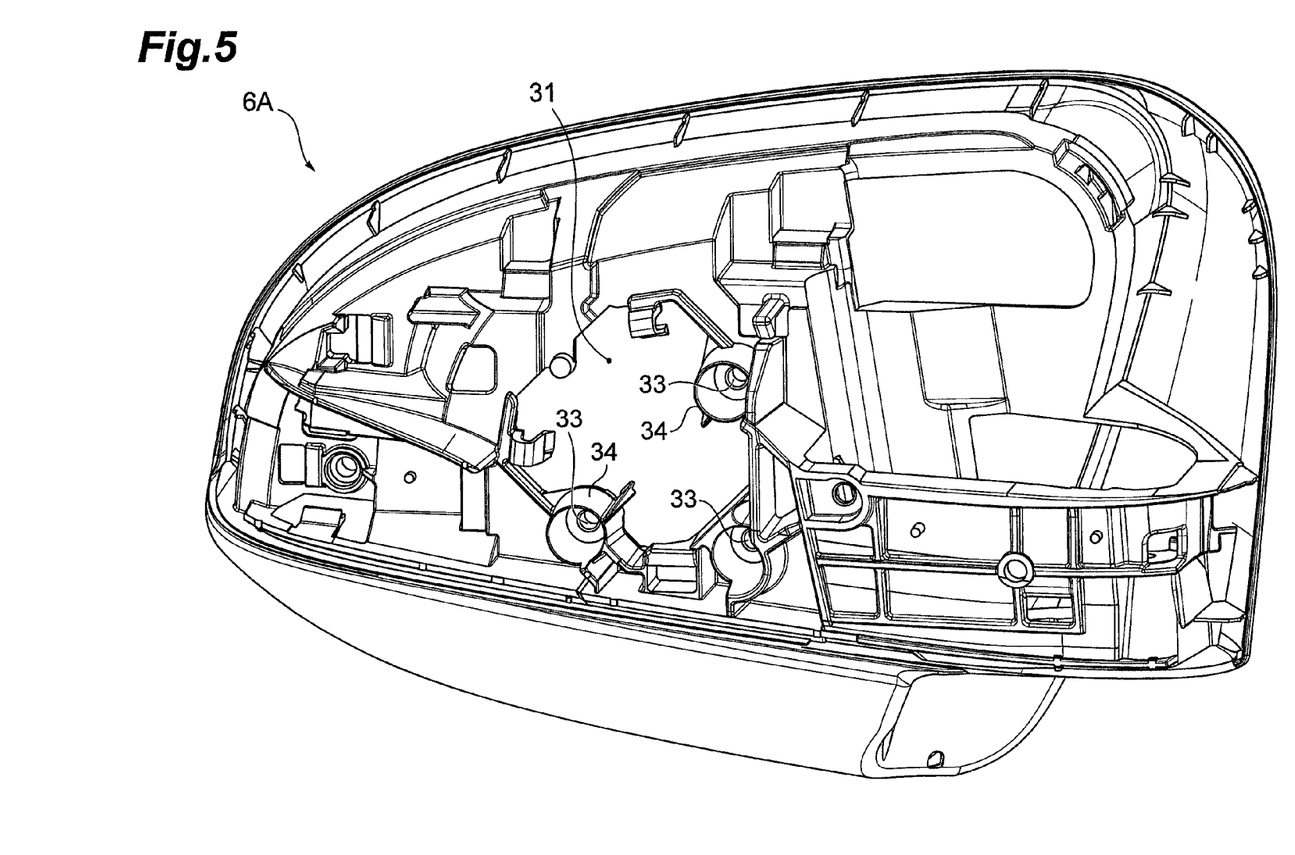
FIG. 5 is a front view showing a housing main body of a mirror housing.

As shown in FIG. 4 and FIG. 5, the housing main body 6A of the mirror housing 6 is provided with a partition wall 30 for partitioning a mirror accommodating space (second space) S1 which is disposed on a rear side for accommodating the mirror unit assembly 25, and a harness accommodating space (first space) S2 which is disposed on a front side for accommodating the harness 10 which is drawn out from the mirror surface angle adjusting unit 20 to outside of the electric door mirror 1. Further, the harness accommodating space S2 is formed by cooperation between the partition wall 30 of the housing main body 6A and the cover member 6b, and the harness 10 is wired around in the harness accommodating space S2.

The partition wall 30 for fixing the mirror surface angle adjusting unit 20 is formed with an opening portion 31 for exposing the terminal portion 23 of the mirror surface angle adjusting unit 20, and insertion holes 33 for inserting screws 32 as a fastening components are formed at a surrounding of the opening portion 31. Further, a reinforcing tube portion 34 erected from the partition wall 30 is provided at each surrounding of the insertion holes 33. In contrast thereto, the back face 20a of the mirror surface angle adjusting unit 20 is formed with female screw holes (fixing holes) 24 enabling to fix the screws 32 at positions in correspondence with the insertion holes 33. In this way, by arranging the insertion holes 33 at the surrounding of the opening portion 31 for exposing the terminal portion 23, the back face 20a of the mirror surface angle adjusting unit 20 can be downsized, which contributes to downsizing a motor holder 51 of the mirror surface angle adjusting unit 20.

The back face 20a of the mirror surface angle adjusting unit 20 is brought into contact with the partition wall 30 of the housing main body 6A in a positioned state, and the screws 32 are inserted into the respective insertion holes 33 from the side of the harness accommodating space S2 in a state of exposing the terminal portion 23 of the mirror surface angle adjusting unit 20 from the opening portion 31 of the partition wall 30. The mirror unit assembly 25 is fixed to the partition wall 30 of the housing main body 6A by screwing the screws 32 to the respective female screw holes 24 of the mirror surface angle adjusting unit 20 and tightening the screws 32. After the screwing operation, the connector portion 10b of the harness 10 is connected to the terminal portion 23 of the back face 20a of the mirror surface angle adjusting unit 20 which is exposed from the opening portion 31.

Also, the connector portion 10c of the harness 10 is connected to the electric storage unit 9, and the connector portion 10d of the harness 10 is connected to the turn lamp unit 8. Further, the turn lamp unit 8 is screwed to the housing main body 6A, and thereafter, the cover member 6b is attachably and detachably fitted to a front face side of the housing main body 6A.

A detailed description will be given here of the mirror surface angle adjusting unit 20.

Figure 9:
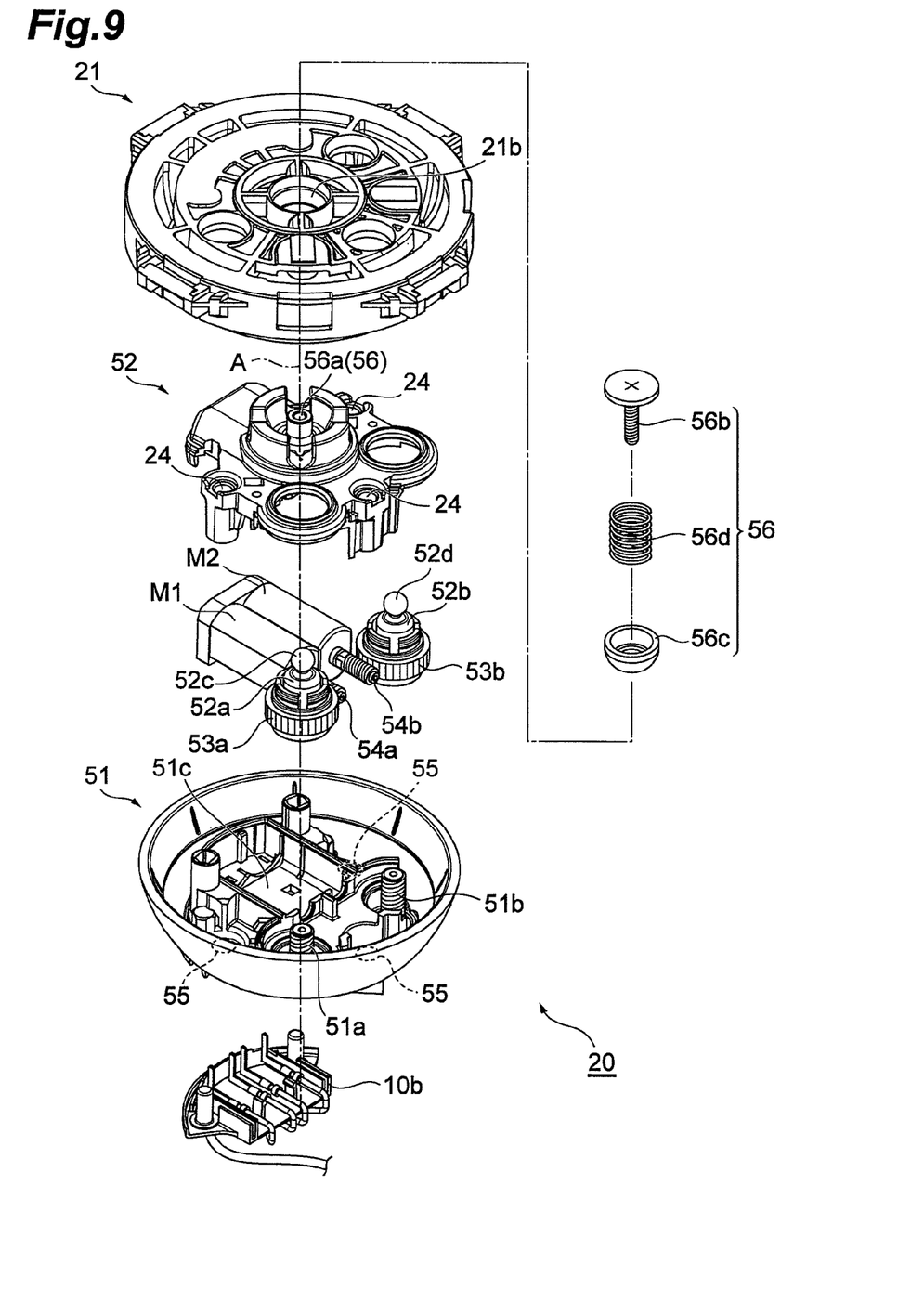
FIG. 9 is an exploded perspective view of a mirror surface angle adjusting unit.

As shown in FIG. 9, the mirror surface angle adjusting unit 20 includes the motor holder 51 in a cup-like shape which is fixed to the partition wall 30, the pivot plate 21 which is fixed to the mirror holder 7 by cooperation between the clamp claw portions 7c and the catch bars 22a and tilted by adjustor rods 52a and 52b that move forward and backward in a center axis A direction by driving of the motors M1 and M2, and an inner member 52 which is accommodated in the motor holder 51 between the motor holder 51 and the pivot plate 21, holds the motors M1 and M2 in the motor holder 51 and is provided with a shaft portion 56 which forms a tilt center of the pivot plate 21.

At the back face of the motor holder 51, the terminal portion 23 which is connected with the connector portion 10b is provided, a motor seating portion 51c is formed on an inner side of the motor holder 51, and two adjustor bolts 51a and 51b are erected. The respective adjustor bolts 51a and 51b are screwed with female screws which are provided at inner portions of the adjustor rods 52a and 52b.

The respective adjustor rods 52a and 52b are connected to worm wheels 53a and 53b via splines, by which the adjustor rods 52a and 52b are rotated along with the worm wheels 53a and 53b and simultaneously therewith, enabled to move forward and backward in the center axis A direction. Further, the worm wheels 53a and 53b are brought in mesh with worms 54a and 54b which are provided at the motors M1 and M2. Furthermore, ball portions 52c and 52d which are provided at top portions of the adjustor rods 52a and 52b are fitted to ball receiving portions (not illustrated) of the pivot plate 21.

The inner member 52 is a part for pressing the motors M1 and M2 which are placed on the motor seating portion 51c of the motor holder 51 from above, and at a (front) surface of the inner member 52, the shaft portion 56 which forms a tilt center of the pivot plate 21 is provided. The shaft portion 56 is configured by a female screw portion 56a which is erected at the surface of the inner member 52, a male screw 56b which is screwed to the female screw portion 56a, a pivoting support cap 56c which is fitted into a recessed portion 21b that is formed at a center of the pivot plate 21, and a compression spring 56d which is arranged between an inner face of the pivoting support cap 56c and a head portion of the male screw 56b. Therefore, the pivot plate 21 can be tilted centering on the shaft portion 56.

Further, the ball portion 52c of the adjustor rod 52a and the ball portion 52d of the adjustor rod 52b are fitted to the respective ball receiving portions of the pivot plate 21 with a phase angle of 90 degrees in a peripheral direction of the pivot plate 21 there between, and the adjustor rods 52a and 52b move forward and backward in the center axis A direction independently from each other by the motors M1 and M2 which are controlled independently from each other. Thus the pivot plate 21 can be made to have a prescribed tilt angle centering on the shaft portion 56 by changes in independent moving amounts of the adjustor rods 52a and 52b.

Further, the female screw holes (fixing holes) 24 is formed at an outer periphery of the inner member 52, and at the motor holder 51, through holes 55 through which the screws 32 penetrate respectively are formed. The female screw holes 24 and the through holes 55 are coaxially disposed.

By adopting such a configuration, when the mirror surface angle adjusting unit 20 is fixed to the partition wall 30 of the mirror housing 6, the screws 32 are inserted into the insertion holes 33 of the partition wall 30 and the through holes 55 of the motor holder 51 respectively from the side of the harness accommodating space S2, and finally, the screws 32 are screwed to the respective female screw holes (fixing holes) 24 of the inner member 52. Therefore, when the screws 32 are continued to be tightened, the inner member 52 is continued to be brought into press contact with the motor holder 51 by a strong force. As a result thereof, the mirror surface angle adjusting unit 20 can be fixed to the partition wall 30 only by the operation of tightening the screws 32. At the same time, the motors M1 and M2 can be clamped firmly and solidly by the inner member 52 and the motor holder 51. Rattling of the motors M1 and M2 can firmly be prevented in the mirror surface angle adjusting unit 20. The inner member 52 and the motor holder 51 can solidly and fixedly be attached to each other. The water tightness of the motors M1 and M2 which are clamped by the inner member 52 and the motor holder 51 can be improved.

According to the electric door mirror 1 having such a configuration, the mirror holder 7 and the mirror surface angle adjusting unit 20 are accommodated in the mirror accommodating space S1 from the side of the mirror exposure opening 6a of the mirror housing 6, the harness 10 is accommodated in the harness accommodating space S2, and the partition wall 30 is provided between the mirror accommodating space S1 and the harness accommodating space S2. By adopting such a configuration, when the mirror surface angle adjusting unit 20 is fixed to the mirror housing 6, the fixing operation can be carried out from the side of the harness accommodating space S2. That is, the mirror surface angle adjusting unit 20 can be fixed to the mirror housing 6 by inserting the screws 32 into the insertion holes 33 of the partition wall 30 respectively from the side of he harness accommodating space S2, and tightening the screws 32 which are penetrated through the partition wall 30 to the mirror surface angle adjusting unit 20. In this way, the operation of tightening the screws 32 is carried out from the side of the harness accommodating space S2, and therefore, there is not the troublesome operation as in the prior art, and an excellent assembly operation performance can be realized.

Furthermore, the mirror housing 6 includes the cover member 6b for covering the harness accommodating space S2 by cooperatively operating with the partition wall 30. Therefore, the screws 32 can be concealed in the harness accommodating space S2 by mounting the cover member 6b, and the external appearance quality of the electric door mirror 1 can be improved without exposing the screws 32.

Next, an explanation will be given of a method of assembling the electric door mirror 1.

Figure 6:
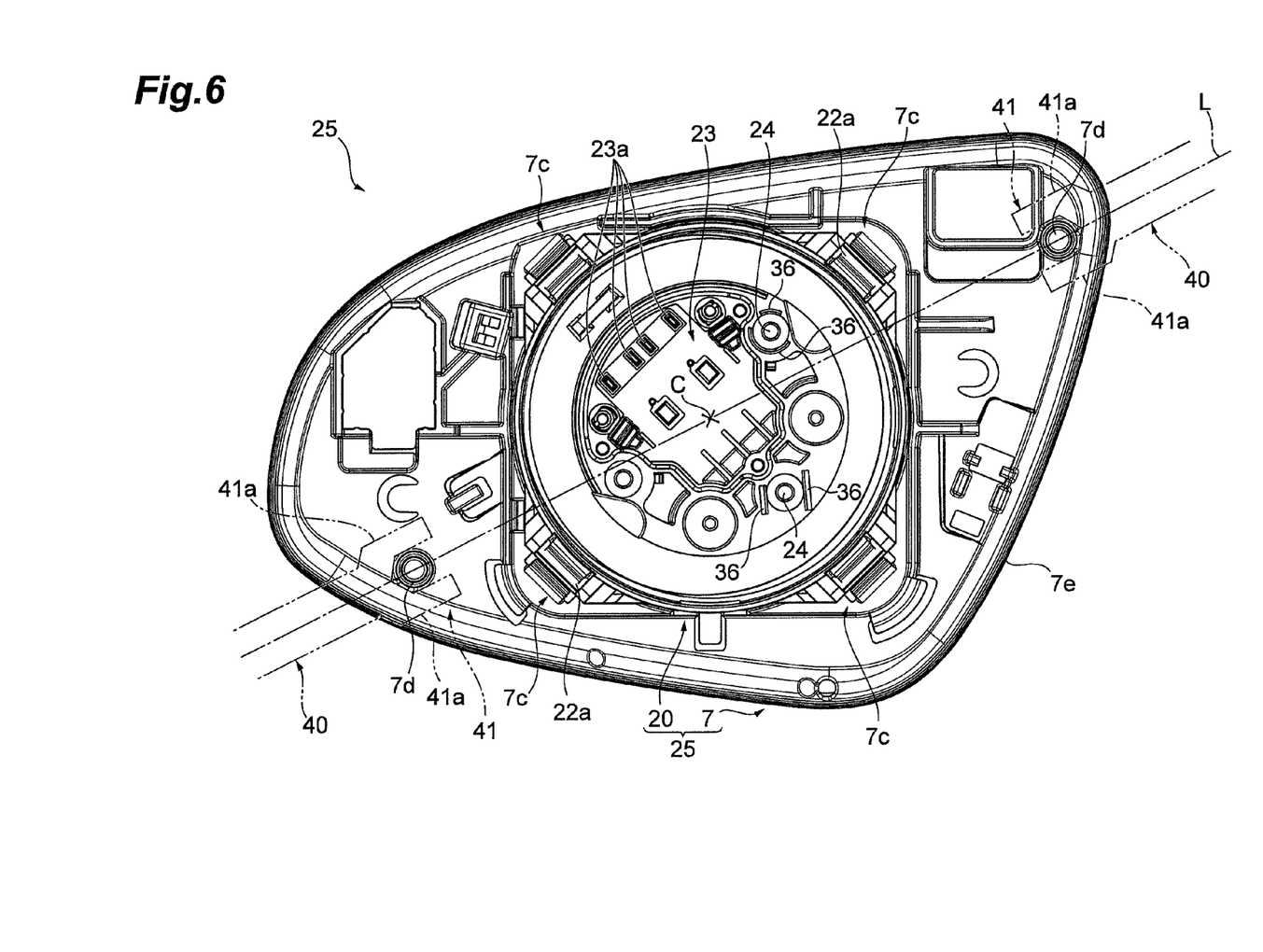
FIG. 6 is a plan view showing a relationship between the mirror unit assembly and a position adjusting jig.

As shown in FIG. 6, the mirror unit assembly 25 is held by position adjusting jigs 40 with the mirror 7a placed downside. In this case, at the back face 7f of the mirror holder 7, there are provided a pair of positioning protrusions 7d having a circular section which are arranged opposedly to each other with a center C as a boundary on a linear line L which passes through a center (that is, gravity center) C of the mirror holder 7. Also, there are respectively provided clamp portions 41 for clamping the respective positioning protrusions 7d at tip ends of the respective position adjusting jigs 40. The clamp portion 41 has bifurcated finger portions 41a, and the positioning protrusion 7d is clamped between the finger portions 41a. Furthermore, the respective position adjusting jigs 40 are reciprocally moved along the linear line L by a linear actuator (not illustrated).

The clamp portions 41 of the position adjusting jigs 40 which are arranged opposedly to each other are moved to be proximate to each other from outer sides toward the center C along the linear line L, and clamp the positioning protrusions 7d by the finger portions 41a of the clamp portions 41 to thereby position the mirror unit assembly 25.

The mirror unit assembly 25 can accurately and firmly be positioned with the mirror 7a of the mirror unit assembly 25 placed downside and the mirror surface angle adjusting unit 20 placed upside by using such position adjusting jigs 40. Further, the back face 20a of the mirror surface angle adjusting unit 20 of the mirror unit assembly 25 and an inner face of the mirror housing 6 can be brought into contact with each other accurately at a prescribed position by covering the mirror housing 6 over the mirror unit assembly 25 after the positioning. As a result thereof, an operation of screwing the screws 32 as the fastening components can firmly be carried out from above the mirror housing 6.

Furthermore, the positioning protrusion 7d is provided at a vicinity of the outer peripheral edge 7e of the mirror holder 7. When such a configuration is adopted, a distance between the center C and the positioning protrusion 7d can be made to be long, by which a positioning accuracy of the mirror unit assembly 25 can be increased.

Figure 7:
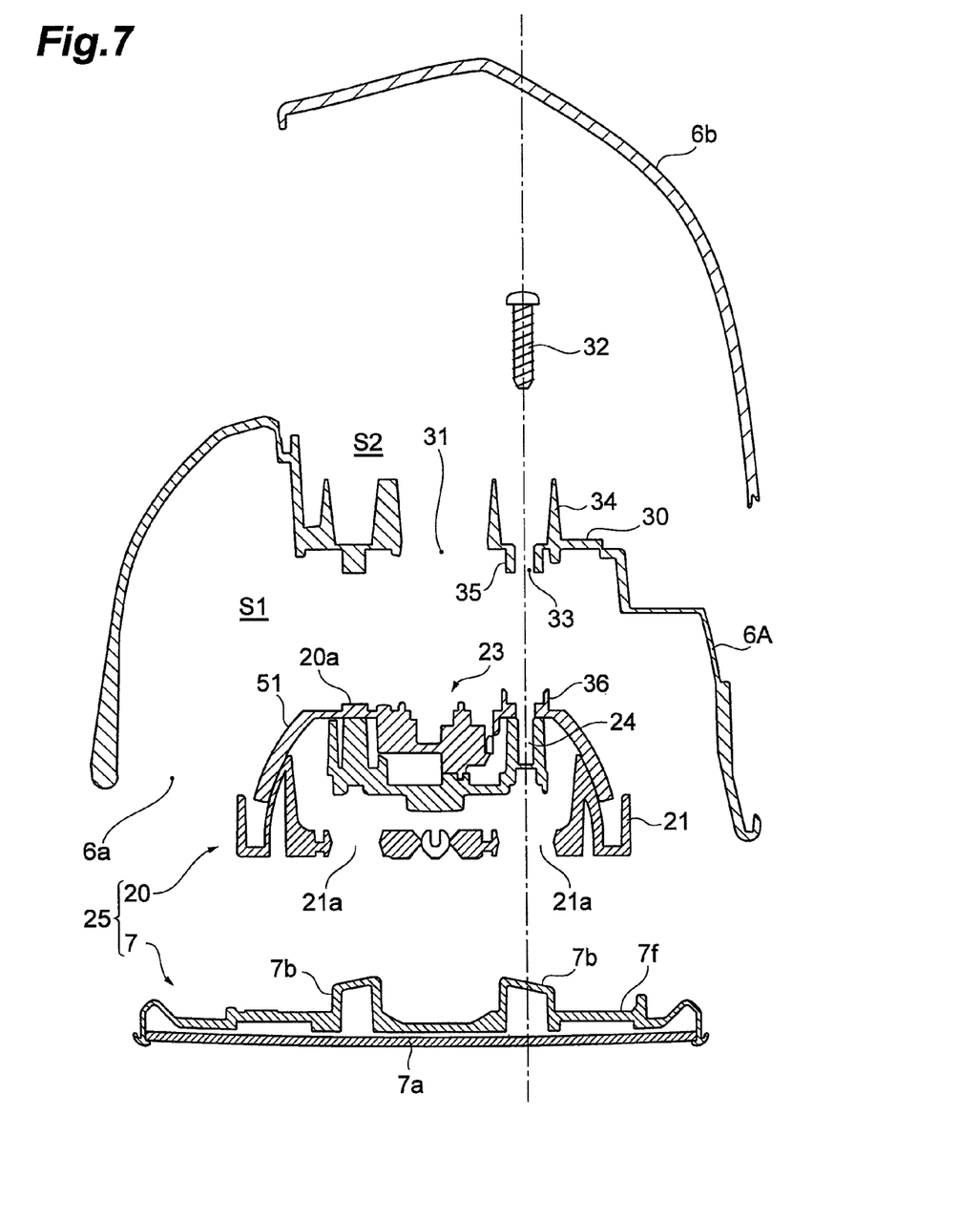
FIG. 7 is a sectional view formed by separating the door mirror in a vertical direction.

As shown in FIG. 7, the mirror unit assembly 25 is accommodated in the mirror accommodating space S1 by inserting the mirror unit assembly 25 into the mirror exposure opening 6a of the mirror housing 6 from above the mirror unit assembly 25 which has been positioned in this way. Furthermore, the back face 20a of the mirror surface angle adjusting unit 20 is brought into contact with the partition wall 30 which is provided in the housing main body 6A, and the terminal portion 23 is exposed from the opening portion 31 of the partition wall 30.

At this occasion, the partition wall 30 is formed with circular tube portions 35 each of which has the insertion hole 33 at an inner portion thereof and is projected to the side of the mirror accommodating space S1. The back face 20a of the mirror surface angle adjusting unit 20 is formed with plural convex pieces 36 which are disposed at surroundings of the female screw holes 24. Therefore, a peripheral face of the circular tube portions 35 are brought into contact with the plural convex pieces 36. Therefore, the housing main body 6A and the mirror unit assembly 25 are positioned. Incidentally, the operation described above is carried out after the door mirror base 2 was attached to the mirror housing 6.

Thereafter, the screws 32 are inserted into the respective insertion holes 33 from an opposite side of the mirror exposure opening 6a of the mirror housing 6, that is, from above, and the screws 32 are screwed to the respective female screw holes (fixing holes) 24 of the mirror surface angle adjusting unit 20 by penetrating the mirror housing 6 to thereby fix the mirror unit assembly 25 to the partition wall 30. Incidentally, the opposite side of the mirror exposure opening 6a of the mirror housing 6 also signifies a side being scheduled to mount the cover member 6b, or the side of the harness accommodating space S2.

Thereafter, the connector portion 10b of the harness 10 which is used for supplying an external power is connected to the terminal portion 23 through the opening portion 31. The connection of the harness 10 which is used for supplying an external power and the mirror surface angle adjusting unit 20 can be carried out after fastening the mirror housing 6 and the mirror unit assembly 25 by adopting such a configuration. Particularly, the connector portion 10b of the harness 10 and the terminal portion 23 of the mirror surface angle adjusting unit 20 can easily be connected from the upside of the mirror housing 6 in the case of the door mirror which is provided with the cover member 6b (ordinarily, painted with a color the same as that of the body of the vehicle) on the front side of the mirror housing 6, which also helps to realize excellent assembly operation performance.

The door mirror fabricating method proceeds to steps of, first, fixing the mirror surface angle adjusting unit 20 to the back face 7f of the mirror holder 7 to thereby configure the mirror unit assembly 25, and fixing the mirror unit assembly 25 to the mirror housing 6 by using the screws 32. That is, the mirror unit assembly 25 is accommodated in the mirror housing 6 from the side of the mirror exposure opening 6a of the mirror housing 6, and thereafter, the back face 20a of the mirror surface angle adjusting unit 20 of the mirror unit assembly 25 and the inner face of the mirror housing 6 are brought into contact with each other.

Under the state, the mirror unit assembly 25 is fixed to the mirror housing 6 by fixing the screws 32 which penetrate the mirror housing 6 to the mirror surface angle adjusting unit 20 from the opposite side of the mirror exposure opening 6a of the mirror housing 6 (that is, the front side of the mirror housing 6 when the side of the mirror exposure opening 6a of the mirror housing 6 is defined as the rear side). According to the electric door mirror 1, the operation for tightening the screws 32 is carried out from the opposite side of the mirror exposure opening 6a of the mirror housing 6 (that is, upside). Therefore, there is no troublesome operation as in the prior art, and an excellent assembly operation performance can be realized.

Figure 8:
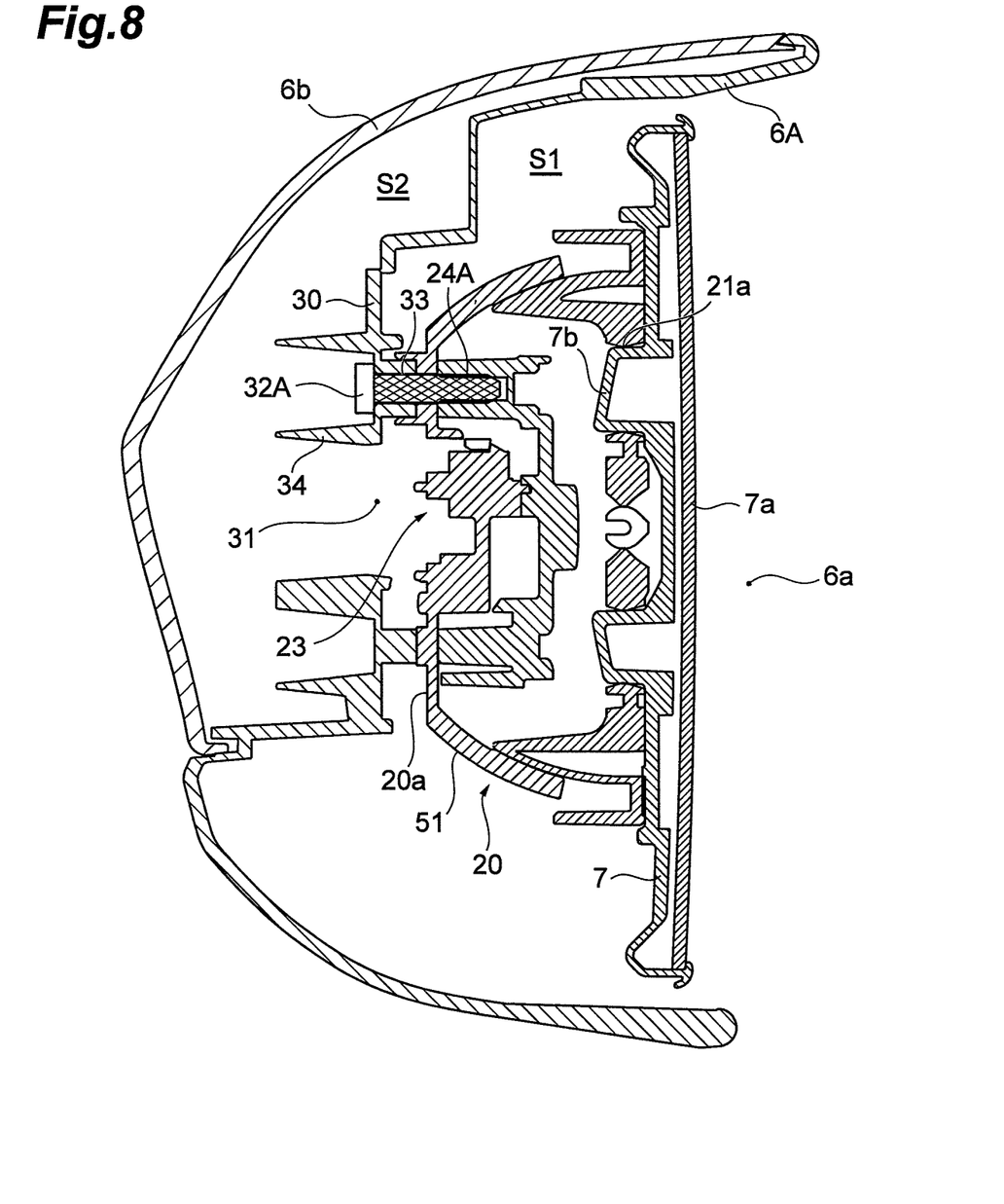
FIG. 8 is a sectional view showing another example of a door mirror.

The present invention is not naturally limited to the embodiment described above. For example, the fastening component is not limited to the screw but may be a driving fit pin 32A as shown in FIG. 8. In this case, the mirror surface angle adjusting unit 20 is formed with a press fit hole (fixing hole) 24A.

What is claimed is:

1. A door mirror configured by incorporating a mirror holder fixed with a mirror, and a mirror surface angle adjusting unit for adjusting an angle of the mirror holder into a mirror housing and exposing the mirror from a mirror exposure opening of the mirror housing;

wherein the mirror housing is provided with a partition wall for partitioning an inner space of the mirror housing to a first space on a front side and a second space on a rear side and fixing the mirror surface angle adjusting unit accommodated in the second space;

wherein the mirror housing includes a cover member for forming the first space in cooperation with the partition wall;

wherein the partition wall is formed with an insertion hole for inserting a fastening component from a side of the first space, and the mirror surface angle adjusting unit is provided with a fixing hole for fastening the fastening component inserted into the insertion hole;

wherein the mirror surface angle adjusting unit includes a motor holder fixed to the partition wall, a pivot plate fixed to the mirror holder and tilted by an adjustor rod that moves forward and backward in a center axis direction by drivin of a motor, and an inner member arranged between the motor holder and the pivot plate to hold the motor in the motor holder and provided with a shaft portion forming a tilt center of the pivot plate; and wherein the inner member is formed with the fixing hole, and the motor holder is formed with a through hole through which a screw as the fastening component penetrates.

2. The door mirror according to claim 1, wherein the partition wall is formed with an opening portion for exposing a terminal portion provided at a back face of the mirror surface angle adjusting unit, and the insertion hole for inserting the fastening component is formed at a surrounding of the opening portion.

* * * * *

UNITED STATES PATENT AND TRADEMARK OFFICE
CERTIFICATE OF CORRECTION

| | | |
|---|---|---|
| PATENT NO. | : 8,858,002 B2 | Page 1 of 1 |
| APPLICATION NO. | : 13/560222 | |
| DATED | : October 14, 2014 | |
| INVENTOR(S) | : K. Suzuki | |

It is certified that error appears in the above-identified patent and that said Letters Patent is hereby corrected as shown below:

In the Claims,

Column 10, line 13 (claim 1, line 23) please change "by drivin of" to -- by driving of --

Signed and Sealed this
Fourteenth Day of July, 2015

Michelle K. Lee
*Director of the United States Patent and Trademark Office*